United States Patent
Henocq et al.

(10) Patent No.: US 9,124,953 B2
(45) Date of Patent: Sep. 1, 2015

(54) METHOD AND DEVICE FOR TRANSMITTING VIDEO DATA

(75) Inventors: Xavier Henocq, Melesse (FR); Fabrice Le Leannec, Mouaze (FR); Patrice Onno, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 474 days.

(21) Appl. No.: 12/782,869

(22) Filed: May 19, 2010

(65) Prior Publication Data

US 2010/0296000 A1    Nov. 25, 2010

(30) Foreign Application Priority Data

May 25, 2009   (EP) .................................... 09290380

(51) Int. Cl.
   *H04N 7/12*      (2006.01)
   *H04N 21/845*    (2011.01)
   *H04N 21/2343*   (2011.01)
   (Continued)

(52) U.S. Cl.
   CPC ......... *H04N 21/8451* (2013.01); *H04N 19/129* (2014.11); *H04N 19/166* (2014.11); *H04N 19/174* (2014.11); *H04N 19/176* (2014.11); *H04N 19/187* (2014.11); *H04N 19/37* (2014.11); *H04N 19/46* (2014.11); *H04N 19/51* (2014.11); *H04N 19/70* (2014.11); *H04N 21/2383* (2013.01); *H04N 21/234327* (2013.01); *H04N 21/2402* (2013.01); *H04N 21/2662* (2013.01);
   (Continued)

(58) Field of Classification Search
   None
   See application file for complete search history.

(56) References Cited

U.S. PATENT DOCUMENTS 6,501,860 B1   12/2002   Charrier et al. ............... 382/240
6,891,895 B1    5/2005   Onno et al. .................... 375/260
(Continued)

FOREIGN PATENT DOCUMENTS

WO   2007/110757 A2   10/2007

OTHER PUBLICATIONS

Nicholson and Lamy-Bergot Thales Ed, "Transmission of JPEG2000 images over a DRM system: error patterns and modelisation of DRM channels", ISO/IEC JTC/SC 29/WG1 N3083, Joint Photographic Expert Group Conference, Oct. 27, 2003.

(Continued)

*Primary Examiner* — Frederick Bailey (74) *Attorney, Agent, or Firm* — Fitzpatrick, Cella, Harper & Scinto (57) ABSTRACT

The method for transmitting video data encoded in a scalable video stream representing said video data in a plurality of layers, comprises, for at least one layer:
   a step of obtaining (317) pre-encoded macroblocks of said scalable video stream representing said video data in a plurality of layers,
   a step of grouping (319) macroblocks, used for inter layer prediction, of the pre-encoded macroblocks obtained by the obtaining step, into first groups of macroblocks,
   a step of grouping (319) macroblocks, not used for inter layer prediction, of the pre-encoded macroblocks obtained by the obtaining step, into second groups of macroblocks,
   a step of estimating a loss variability over a network,
   a step of selecting (331) groups of macroblocks from the first and second groups of macroblocks based on the loss variability estimated by the estimating step and
   a step of transmitting (333) the groups of macroblocks selected by the selecting step over the network.

15 Claims, 8 Drawing Sheets

(51) Int. Cl.

| | | |
|---|---|---|
| *H04N 21/2383* | (2011.01) | |
| *H04N 21/24* | (2011.01) | |
| *H04N 21/2662* | (2011.01) | |
| *H04N 21/6405* | (2011.01) | |
| *H04N 21/6437* | (2011.01) | |
| *H04N 19/176* | (2014.01) | |
| *H04N 19/70* | (2014.01) | |
| *H04N 19/46* | (2014.01) | |
| *H04N 19/51* | (2014.01) | |
| *H04N 19/129* | (2014.01) | |
| *H04N 19/37* | (2014.01) | |
| *H04N 19/166* | (2014.01) | |
| *H04N 19/174* | (2014.01) | |
| *H04N 19/187* | (2014.01) | |

(52) U.S. Cl.
CPC ....... *H04N 21/6405* (2013.01); *H04N 21/6437* (2013.01)

(56) References Cited

U.S. PATENT DOCUMENTS

| | | | | |
|---|---|---|---|---|
| 7,012,974 B1* | 3/2006 | Liu et al. | ............ | 375/340 |
| 7,113,643 B2 | 9/2006 | Le Leannec et al. | ......... | 382/235 |
| 7,190,838 B2 | 3/2007 | Le Leannec et al. | ......... | 382/233 |
| 7,212,678 B2 | 5/2007 | Brown et al. | ............ | 382/240 |
| 7,215,819 B2 | 5/2007 | Onno et al. | ............ | 382/240 |
| 7,260,264 B2 | 8/2007 | Guillou et al. | ............ | 382/232 |
| 7,281,033 B2 | 10/2007 | Le Leannec et al. | ......... | 709/217 |
| 7,382,923 B2 | 6/2008 | Onno | ............ | 382/233 |
| 7,453,937 B2 | 11/2008 | Henocq et al. | ......... | 375/240.03 |
| 7,466,865 B2 | 12/2008 | Henocq et al. | ......... | 382/239 |
| 7,499,546 B2 | 3/2009 | Donescu et al. | ............ | 380/217 |
| 7,571,316 B2 | 8/2009 | Onno et al. | ............ | 713/160 |
| 7,580,578 B1 | 8/2009 | Onno et al. | ............ | 382/232 |
| 7,746,332 B2 | 6/2010 | Le Leannec et al. | ......... | 345/204 |
| 7,912,985 B2 | 3/2011 | Le Leannec et al. | ......... | 709/247 |
| 8,135,065 B2 | 3/2012 | Henocq et al. | ......... | 375/240.16 |
| 2003/0048791 A1* | 3/2003 | De Cnodder et al. | .... | 370/395.42 |
| 2003/0099298 A1* | 5/2003 | Rose et al. | ......... | 375/240.27 |
| 2004/0073641 A1* | 4/2004 | Minhazuddin et al. | ....... | 709/223 |
| 2004/0179617 A1* | 9/2004 | Cai et al. | ......... | 375/240.26 |
| 2005/0152392 A1* | 7/2005 | Lim et al. | ......... | 370/432 |
| 2006/0146934 A1* | 7/2006 | Caglar et al. | ............ | 375/240.12 |
| 2006/0182178 A1* | 8/2006 | Oi et al. | ......... | 375/240.16 |
| 2006/0251167 A1* | 11/2006 | Van Der Schaar et al. | ......... | 375/240.02 |
| 2007/0019721 A1 | 1/2007 | Le Leannec et al. | ...... | 375/240.1 |
| 2007/0091883 A1* | 4/2007 | Wee et al. | ......... | 370/389 |
| 2007/0121723 A1 | 5/2007 | Mathew et al. | ......... | 375/240.12 |
| 2007/0195880 A1 | 8/2007 | Henocq et al. | ......... | 375/240.13 |
| 2007/0223033 A1 | 9/2007 | Onno et al. | ............ | 358/1.15 |
| 2007/0230567 A1* | 10/2007 | Wang et al. | ......... | 375/240.1 |
| 2007/0263087 A1 | 11/2007 | Hong et al. | ......... | 348/14.13 |
| 2007/0274381 A1 | 11/2007 | Li et al. | ......... | 375/240.01 |
| 2007/0286508 A1 | 12/2007 | Le Leannec et al. | ......... | 382/240 |
| 2008/0025399 A1 | 1/2008 | Le Leannec et al. | ..... | 375/240.16 |
| 2008/0075170 A1 | 3/2008 | Henocq et al. | ......... | 375/240.16 |
| 2008/0095231 A1 | 4/2008 | Onno et al. | ......... | 375/240.12 |
| 2008/0130736 A1 | 6/2008 | Onno et al. | ......... | 375/240.01 |
| 2008/0131011 A1 | 6/2008 | Le Leannec et al. | ......... | 382/238 |
| 2008/0144725 A1 | 6/2008 | Henocq et al. | ......... | 375/240.27 |
| 2009/0016433 A1 | 1/2009 | Henocq et al. | ......... | 375/240.01 |
| 2009/0064254 A1 | 3/2009 | Henocq et al. | ......... | 725/116 |
| 2009/0122865 A1 | 5/2009 | Henocq et al. | ......... | 375/240.12 |
| 2009/0278956 A1 | 11/2009 | Le Leannec et al. | ...... | 348/222.1 |
| 2009/0290648 A1 | 11/2009 | Onno et al. | ......... | 375/240.27 |
| 2009/0310674 A1 | 12/2009 | Le Leannec et al. | ..... | 375/240.12 |
| 2010/0142622 A1 | 6/2010 | Le Leannec et al. | ..... | 375/240.16 |
| 2010/0316139 A1 | 12/2010 | Le Leannec et al. | ..... | 375/240.29 |
| 2011/0013701 A1 | 1/2011 | Henocq et al. | ......... | 375/240.25 |
| 2011/0038557 A1 | 2/2011 | Closset et al. | ............ | 382/251 |
| 2011/0122945 A1* | 5/2011 | Li et al. | ......... | 375/240.12 |
| 2011/0188573 A1 | 8/2011 | Laroche et al. | ......... | 375/240.12 |
| 2012/0207210 A1 | 8/2012 | Laroche et al. | ......... | 375/240.03 |

OTHER PUBLICATIONS

Ferre, P., et al., "Robust Video Transmission Over Wireless LANs" IEEE Transactions on Vehicular Technology, vol. 57, No. 4, Jul. 1, 2008, pp. 2596-2602.

Bakker, D. et al., "Optimized erasure-resilient streaming of SVC using unequal error protection" 15$^{th}$ International Conference on Systems, Signals and Image Processing, Jun. 25, 2008, pp. 413-416.

Cho, H.Y. et al., "Adaptive QoS Control for Scalable Video Streaming over WLAN", Pacific-Rim Symposium on Image and Video Technology (PSIVT2006), Lecture Notes in Computer Science (LNCS) 4319, Jan. 1, 2006, pp. 949-958.

Wang, Y. et al,. "System and Transport Interface of H.264/AVC Scalable Extension", IEEE Int'l Conference on Image Processing, Oct. 1, 2006, pp. 165-168.

T. Wiegand et al., "Joint Draft ITU-T Rec. H.264 | ISO/IEC 14496-10/Amd.3 Scalable Video Coding," Joint Video Team (JVT) of ISO/IEC MPEG & ITU-T VCEG (ISO/IEC JTC1/SC29/WG11 and ITU-T SG16 Q.6), Document No. JVT-X201, 24$^{th}$ Meeting: Geneva, Switzerland, Jun. 29-Jul. 5, 2007, pp. 1-563.

* cited by examiner

METHOD AND DEVICE FOR TRANSMITTING VIDEO DATA

FIELD OF THE INVENTION

The present invention relates to a method and a device for transmitting video data. It applies, more particularly to transmission of video data pre-encoded using a scalable video coding ("SVC"). Even more particularly, the present invention may be used in the field of video transmission over a packet network between a server and a client, when the protocol RTP ("Real Time Protocol") is used as a transport protocol.

BACKGROUND OF THE INVENTION

In the field of video transmission over a packet network, the network is non reliable since it doesn't ensure stable conditions nor the reliable transmission of packets, i.e. packet losses may occur.

The video data to be transmitted is supposed to be pre-encoded in a scalable video stream according to a video coding format of a video coding standard. In that context, the video data to be transmitted is represented by a set of layers and an adaptation of the video data to the transmission constraints consists in the selection of a subset of layers to be transmitted. This selection process, typically managed by a decision engine at the server side, is improved to better take into account the variation of the network conditions.

SVC is a new video standard extending H.264 with scalability features. H.264 constitutes the state of the art in terms of video compression. This standard developed by JVT ("Joint Video Team") significantly enhances the compression efficiency as compared to MPEG-2, MPEG-4 part 2 and H.263. In terms of technology, H.264 is always based on the traditional hybrid scheme using a combination of spatial transform and motion estimation/compensation. However, this general scheme has been optimized to obtain better compression efficiency. Similarly to H.264, SVC processes data by macroblocks, which may be gathered into slices which are encoded separately.

SVC added adaptation capabilities to H.264 in the form of scalability features. Three scalability axes have been defined in SVC, spatial, temporal and quality scalabilities. Temporal scalability allows modifying the temporal resolution of a sequence by removing some frames, the removal taking into account the frame dependencies. Spatial scalability consists in inserting several resolutions in a video stream, the lowest resolution being used for the prediction of the highest resolutions. Quality scalability also known as SNR scalability, takes the form of Coarse Grain Scalability (CGS), Medium Grain Scalability (MGS) and Fine Grain Scalability (FGS).

Many works have focused in the past on scalable video transmission over a non reliable channel. When the video is pre-encoded and stored on the server side, one key point is the selection of the most appropriate layers based on the network conditions. Generally, this process is performed by a decision engine and consists in a rate distortion optimization under a rate constraint. Several sets of layers can be potentially selected by the decision engine. Some of these sets are optimal in terms of quality under the given rate constraint but are sensitive to losses. Others are less sensitive to losses, but do not provide the optimal quality.

DISCUSSION OF RELATED ART

For example, considering a SVC group of pictures comprising a base layer, a spatial enhancement layer wherein each spatial layer is enhanced by several CGS layers, classically a server performs a selection of data to transmit under a given bitrate constraint relating to the network status.

One classical solution consists in separating the macroblocks of the base layer used for inter-layer prediction (ILP) and the macroblocks of the base layer not used for inter-layer prediction (ILP) and transmitting to the client only the macroblocks used for ILP and as much data of the enhancement layers as allowed by the remaining bitrate. In case of partial loss in the enhancement layer, the frames depending on the lost data cannot be decoded. Moreover, when a loss occurs in the enhancement layer, nothing can be decoded in the base layer since this layer has been received only partially. Therefore, no minimum quality can be asserted in case of transmission losses.

Another classical solution consists, for the decision engine, in selecting the entire base layer, including macroblocks used for ILP and macroblocks not used for ILP, and transmitting part of the enhancement layer according to the available bitrate. However, this solution is sub optimal, since, if there are no losses, more enhancement layer data could be transmitted to improve the quality.

A more sophisticated method for the decision engine to adapt its selection of layers and slices based on a bitrate constraint is described in US 2007 0263087. In a client/server application delivering SVC encoded video, a server is mainly constituted of an encoder and a Thinning Unit ("TU"). The encoder receives network information (available bitrate, loss rate) and adapts the encoding according to this information. In order to ensure the stream robustness, the encoder reduces the amount of data predicted by ILP based on the loss rate. The encoding process is then followed by the thinning process performed by the thinning unit. Thinning consists in reducing the bitrate of the frames by completely or partially removing data not used for ILP. Thinning can be applied to all frames generated by the encoder or only to a subset of these frames. Indeed, the encoder selects a set of frames on which the thinning process will not be applied in order to increase the stream robustness by insuring that all layers will be decodable. Note that, in this method, the main part of the adaptation is performed by the encoder. Even if it is mentioned that the thinning unit can adapt its process to the network conditions, no adaptation method is proposed.

Other methods adapting a video stream to losses are known. These methods try to avoid obtaining loss configurations described above. A first method consists in generating redundant data in order to retrieve missing data in case of losses. This method called "FEC" (Forward Error Correction) consists in allocating an amount of redundant data adapted to an estimated loss rate. These FEC can be generated in the form of error correcting codes (for example, Reed-Solomon, Xor, ... ), or in the form of low quality version of the original data to transmit.

The efficiency of this method depends on the quality of the loss rate estimation. The loss rate is computed as the number of lost packets divided by the number of transmitted packets during a given period of time. This value is therefore an average value, and cannot represent the variation of the number of losses during this period. For instance, with the loss rate, one cannot identify losses spread regularly during the period from losses occurring in bursts of consecutive losses. Since the amount of redundant data is dependent on the loss rate, the FEC are efficient for losses occurring regularly but not for losses occurring by bursts with high variation of the amount of losses during the measurement period.

Another solution consists in assigning to each packet transporting the video data, a priority level depending on the data transported. For instance, these priority levels are based on the importance of the data (e.g., data used as reference for prediction being more important than other data). However, this solution again doesn't solve the problem of bursts of losses, since high priority packets can be lost with low priority packets if the burst of losses lasts sufficiently.

SUMMARY OF THE INVENTION

The present invention aims to remedy at least one of these drawbacks.

To that end, according to a first aspect, the present invention relates to a method for transmitting video data encoded in a scalable video stream representing said video data in a plurality of layers, that comprises, for at least one layer:
- a step of obtaining pre-encoded macroblocks of said scalable video stream representing said video data in a plurality of layers,
- a step of grouping macroblocks, used for inter layer prediction, of the pre-encoded macroblocks obtained by the obtaining step, into first groups of macroblocks,
- a step of grouping macroblocks, not used for inter layer prediction, of the pre-encoded macroblocks obtained by the obtaining step, into second groups of macroblocks,
- a step of estimating a loss variability over a network,
- a step of selecting groups of macroblocks from the first and second groups of macroblocks based on the loss variability estimated by the estimating step and
- a step of transmitting the groups of macroblocks selected by the selecting step over the network.

The method of the present invention thus better takes into account the behavior of the losses over the network. Moreover, the selection of transmitted macroblocks is automatic and a minimum quality is guaranteed.

In the context of SVC video transmission over a non reliable network, the embodiment of the present invention thus provides for a method allowing the selection of a set of groups of macroblocks to be transmitted based on information representative of the network status.

According to an embodiment, pre-encoded macroblocks are encoded using a video coding standard and in the steps of grouping macroblocks, groups of macroblocks correspond to a syntaxical entity of said coding video standard. Thus, the client that receives the transmitted macroblocks may be standard and does not need to be adapted to implement the present invention.

According to another embodiment, said video coding standard uses slices for encoding groups of macroblocks, and in the steps of grouping macroblocks, macroblocks are gathered into groups corresponding to slices.

This embodiment is particularly adapted for SVC video coding standard.

According to an embodiment, said video coding standard comprises scalable quality layers and in the steps of grouping macroblocks, macroblocks are gathered into groups corresponding to scalable layers.

Thanks to each one of this features, gathering macroblocks in standard entities, allows easy identification and suppression when needed.

According to an embodiment, in the step of estimating a loss variability, the estimated loss variability is based on a variance of a loss rate over the network.

Advantageously, the loss variability is easy to estimate using the variance of the loss rate over the network.

According to another embodiment, in the step of estimating a loss variability, the estimated loss variability is based on a size of a burst of consecutive packet losses.

According to an embodiment, in the step of estimating a loss variability, a loss pattern received from a receiver of the transmitted macroblocks is processed.

Thanks to these features, it is possible to easily update the estimation of the loss variability on a regular basis.

The loss pattern can serve for both estimating the variance of the loss rate over the network and the size of a burst of consecutive packet losses.

According to an embodiment, the groups of macroblocks selected by the selecting step are included in layers of the said plurality of layers representing said video data, and in the transmitting step, a subset of layers representing said video data is transmitted, said subset being selected based on a computed network available bitrate.

According to an embodiment, the computation of the network available bitrate comprises the computing of a loss event rate providing a representation of the packet loss process over the network.

Advantageously, the computation of the available bitrate on the network takes into account the actual losses over the network.

According to an embodiment, said video data is represented in a plurality of scalable layers comprising scalable spatial layers and/or scalable quality layers and wherein in the step of transmitting selected macroblocks, all data corresponding to a scalable spatial or quality layer are transmitted on a dedicated multicast session of said transmitting step.

These features induce that the server creates a session for each layer. Theoretically, it allows de-correlation of the losses between the sessions. One consequence is that the server receives information representing the network status for each multicast session.

Thanks to these features, it is possible to compute network characteristics for each session.

According to an embodiment, a loss event rate is computed globally for all packets transmitted, independently of the multicast session.

According to an embodiment, in the step of selecting groups of macroblocks based on the estimated loss variability, the selection of macroblocks from the first and second groups of macroblocks is done based on an estimation of errors remaining after a correction by an error correction process based on forward error correction data transmitted for said macroblocks.

Thanks to these features, the selection process better takes into account the behavior of the network.

According to an embodiment, in the step of grouping macroblocks not used for inter layer prediction, macroblocks not used for inter layer prediction are separated into a plurality of second groups of macroblocks based on their efficiency for error concealment of an enhancement layer and, in the step of selecting groups of macroblocks from the plurality of second groups of macroblocks, the selection is based on said efficiency for error concealment of an enhancement layer.

Thanks to these features, transmitting macroblocks not used for inter layer prediction but efficient for concealing potential losses in the enhancement layer without transmitting less efficient macroblocks adds granularity in the adaptation process.

These additional groups of macroblocks could also be inserted in a dedicated slice group or CGS layer. The transmission of these additional groups of macroblocks may depend on criteria based on the residual losses, for example with a threshold different than the one used for the first and second groups of macroblocks.

According to a second aspect, the present invention relates to a device for transmitting video data encoded in a scalable video stream representing said video data in a plurality of layers, that comprises:

means for obtaining pre-encoded macroblocks of said scalable video stream representing said video data in a plurality of layers, means for grouping macroblocks used for inter layer prediction in first groups of macroblocks, means for grouping macroblocks not used for inter layer prediction in second groups of macroblocks, means for estimating a loss variability over a network, means for selecting groups of macroblocks from the first and second groups of macroblocks based on the estimated loss variability and means for transmitting the selected groups of macroblocks over the network.

According to a third aspect, the present invention relates to a computer program loadable into a computer system, said program containing instructions enabling the implementation of the method of the present invention, as set forth above, when that program is loaded and executed by a computer system.

According to a fourth aspect, the present invention relates to an information carrier readable by a computer or a microprocessor, removable or not, storing instructions of a computer program, characterized in that it enables the implementation of the method of the present invention as succinctly set forth above.

As the advantages, objectives and characteristics of this device, of this computer program and of this information carrier are similar to those of the method, as set forth above, they are not repeated here.

BRIEF DESCRIPTION OF THE DRAWINGS

Other advantages, objectives and features of the present invention will be disclosed in the following description, given, with an explanatory purpose that is in no way limiting, with respect to the accompanying drawings in which.

DESCRIPTION OF THE PREFERRED EMBODIMENT

As will be apparent from the description of the figures, the main steps of the embodiment of the method of the present invention are performed on a server side. When this method is used the client does not need to perform specific steps. However, the client side receives, decodes and displays the video stream and forwards to the server side some information representative of the network status.

Firstly, a more detailed description of SVC video coding standard is given below.

In terms of technology, H.264 is always based on the traditional hybrid scheme using a combination of spatial transform and motion estimation/compensation. However, this general scheme has been optimized to obtain better compression efficiency, by at least:

replacing the traditional 8×8 DCT ("Discrete Cosine Transform") transform by an equivalent integer 4×4 transform, providing motion estimation accurate as far as a quarter of a pixel motion, providing variable macroblock shapes, using new arithmetic and VLC coding (CABAC, CAVLC) and providing intra prediction.

Several encoding modes are available for the encoding of macroblocks. Some can be gathered under the same concept:

INTRA: Intra coding is a spatial coding. The macroblock is coded independently of any other information from other images, INTER or "P": An inter macroblock is the result of a temporal prediction from a previously encoded image. This type of macroblock is encoded in the form of a motion vector and residual data, Bidirectional or "Bidir" or "B": B macroblocks use the same principle as P macroblocks since they are also the result of a temporal prediction. However, in the case of B macroblocks, two reference areas, extracted respectively from a previous and a following frame or image, are used for prediction. As a consequence this type of macroblock is encoded in the form of a residual and two motion vectors, "P_SKIP": for P_SKIP macroblocks, no further data is encoded in the bitstream except the macroblock type. A possible motion vector of a P_SKIP macroblock is deduced from the surrounding encoded macroblocks, "B_SKIP", "B_direct_16×16" and "B_direct_8×8": no motion information is transmitted with such macroblocks. Information is derived from surrounding already encoded macroblocks or from the motion vector of the collocated macroblock in the following reference frame. In addition, no residual data is encoded with B_SKIP macroblocks.

During the encoding process, a macroblock mode selection process is performed. When INTRA mode is selected for a macroblock, Intra prediction consists in predicting this macroblock in the pixel domain by using the pixels located at the external border of this macroblock. A DCT is then applied to the difference between the prediction and the original and this difference is encoded.

Such predictive coding is also applied on the motion vectors. Indeed, a motion vector in a temporally predicted macroblock, is encoded predicatively using motion vectors of macroblocks in the neighborhood. As a consequence, the absolute value of a motion vector is not encoded but replaced by the difference between a vector component to be used and its prediction.

Each macroblock is associated with a parameter "Coded_block_pattern" specifying which of the six 8×8 blocks (luma and chroma) may contain non-zero transform coefficient levels.

Some error resilience tools were also defined in H.264. One of the most interesting is Flexible Macroblock Ordering ("FMO"). FMO is based on the concept of slice group. A slice is a set of macroblocks gathered behind a header. A slice group gathers several disconnected slices in a frame, a slice being composed of macroblocks. FMO consists in deciding to which slice belongs a macroblock in an image. Seven types of slice groups were defined in H.264. Type "6" is the most random one and uses a map to assign macroblocks to a slice group.

Figure 1:
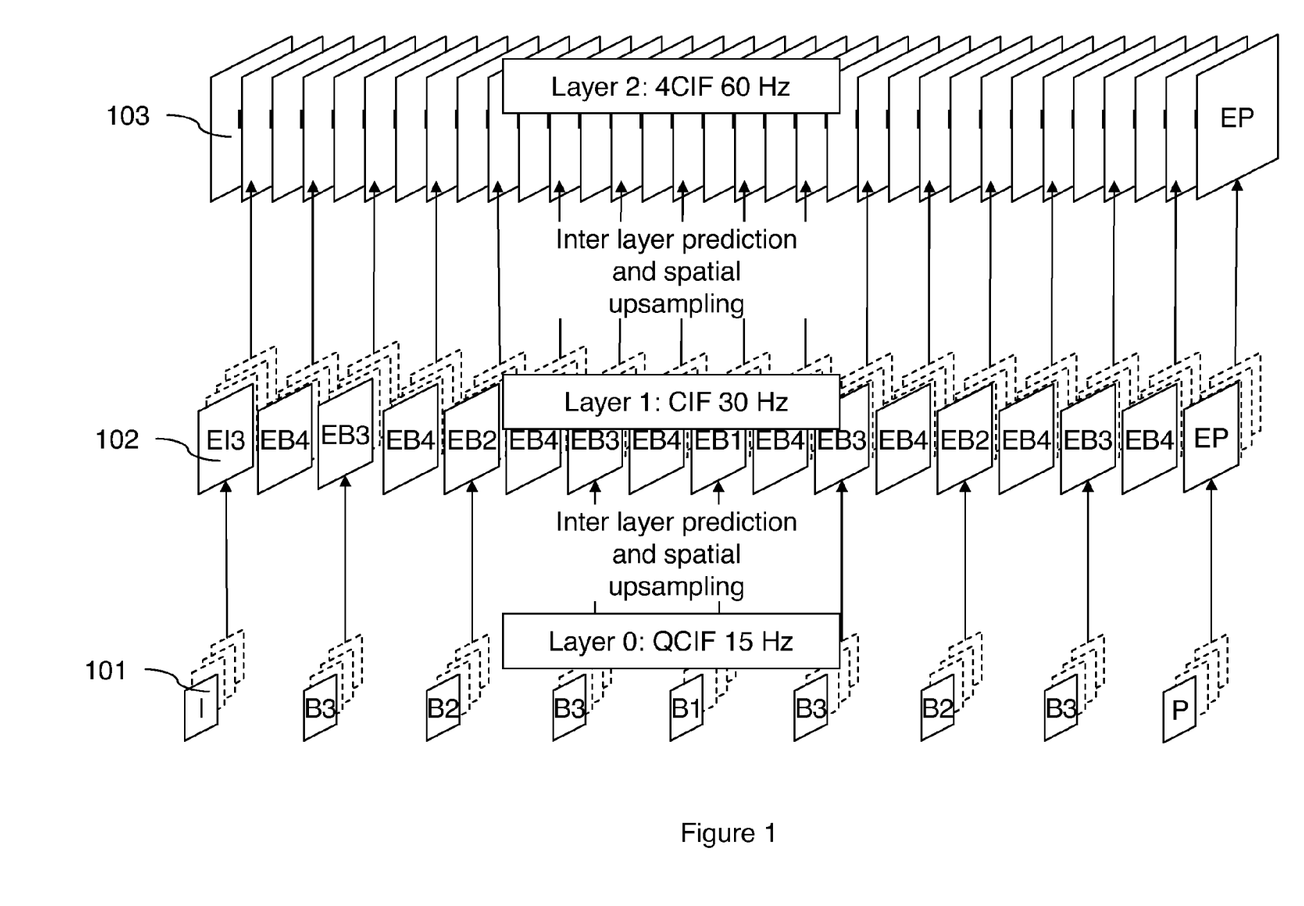
FIG. 1 is a representation of images of a SVC video.

SVC added adaptation capabilities to H.264 in the form of scalability features. Three scalability axes have been defined in SVC, spatial, temporal and quality scalabilities, as represented in FIG. 1. Temporal scalability allows modifying the temporal resolution of a sequence by removing some frames, the removal taking into account the frame dependencies. In FIG. 1, a higher layer 103 has twice the number of frames of an intermediate layer 102, which, in turn, has twice the number of frames of a lower layer 101. Spatial scalability consists in inserting several resolutions in a video stream, the lowest resolution being used for the prediction of the highest resolutions. In FIG. 1, the higher layer 103 has, in each direction, twice the resolution of the intermediate layer 102, which, in turn, has twice the resolution of the lower layer 101. SVC authorizes the use of any resolution ratio value between two successive spatial resolutions even if only a ratio of two was allowed by previous scalable codecs (codec stands for coder-decoder). Quality scalability also known as SNR scalability, takes the form of Coarse Grain Scalability (CGS), Medium Grain Scalability (MGS) and Fine Grain Scalability (FGS).

CGS SNR scalable coding is achieved using the same concepts as spatial scalability. The only difference is that, for CGS, the upsampling operation of the inter layer prediction is omitted.

FGS scalability results in a bitstream that can be truncated at any point of the bitstream, without preventing the decoding process. This feature is particularly interesting for precisely modifying the video bitrate.

MGS has been defined as an intermediary scalability between CGS and FGS. It offers finer decoding points in the bitstream than CGS but does not provide for a truncation at any point of the bitstream. Many encoding and network experts think that MGS offers a sufficient granularity for realistic network conditions.

As seen above, scalability is based on inter layer prediction ("ILP"). Several coding modes have been specifically designed for ILP in SVC:

"IntraBL" or "I_BL": This mode allows predicting a macroblock in an enhancement layer based on the co-located macroblock in the lower layer. The lower layer macroblock is interpolated in order to be re-scaled to the enhancement layer resolution. The difference between the macroblock to be encoded and the interpolated co-located macroblock is then encoded, motion vector prediction: in this mode, it is considered that the enhancement layer macroblock has a motion close to the lower layer macroblock. In that case, at most a small variation of the lower macroblock motion vector is encoded in the enhancement layer, residual prediction: in that mode, it is considered that a macroblock in an enhancement layer that has a motion close to the co-located macroblock in the lower layer, also has similar residual data. As a consequence the residual difference is encoded.

Macroblocks in an enhancement layer using a lower layer data as a reference for its encoding, are identified by the value of a flag called "base_mode_flag". If set to "1", this flag indicates that the macroblock prediction mode as well as the corresponding motion data are inferred from the base layer. A second flag called "residual_prediction_flag" indicates that the residual data of the concerned macroblock is predicted using lower layer data. A third flag called "motion_pred_flagIX[mbPartIdx]" indicates if the motion vectors of the concerned macroblock are inferred from the base layer.

With H.264 and SVC, the transmission of a video over a network is facilitated with the concept of Network Abstraction Layer ("NAL"). A NAL is a sort of container providing, in its header, a short description of the data that is embedded in the data part. When transporting an SVC stream, the NAL header is composed of two parts. A first part inherited from H.264 comprises three elements:

"forbidden_zero_bit": this element is used for error resilience,

"nal_ref_idc": this element specifies if the NAL contains data necessary to decode some following data or not. If not equal to "0", the NAL can transport, for instance, a reference picture and "nal_unit_type": this element indicates the type of data contained in the NAL. Most usual types are:
"nal_unit_type"="1" for non reference picture or slice,
"nal_unit_type"="5" for reference picture or slice,
"nal_unit_type"="7" for sequence parameter set (a particular NAL describing a video sequence),
"nal_unit_type"="8" for picture parameter set (a particular NAL providing a description of a set of frames referring to it) and
"nal_unit_type"=20 for SVC picture or slice.

A second part complements the H.264 header with SVC information:

"reserved_one_bit": this element is used for error resilience,

"idr_flag": this element indicates if the NAL contains data necessary to decode some following data, "priority_id" specifies a priority identifier for the NAL unit, "no_inter_layer_prediction_flag" indicates if inter layer prediction is used to decode the contained video data, "dependency_id", or "Did", specifies the spatial layer of the contained video data, "Quality_id", or "Qid", specifies the quality layer of the contained video data, "Temporal_id", or "Tid" specifies the temporal layer of the contained video data, "Use_ref_base_pic_flag" specifies that the reference base pictures are used for inter layer prediction, "Discardable_flag" specifies if the current NAL is used for decoding any other NAL, "Output_flag" specifies if the video data contained in the current NAL will be outputted by the decoder and Reserved_three_bits", which shall be equal to "3".

Figure 2:
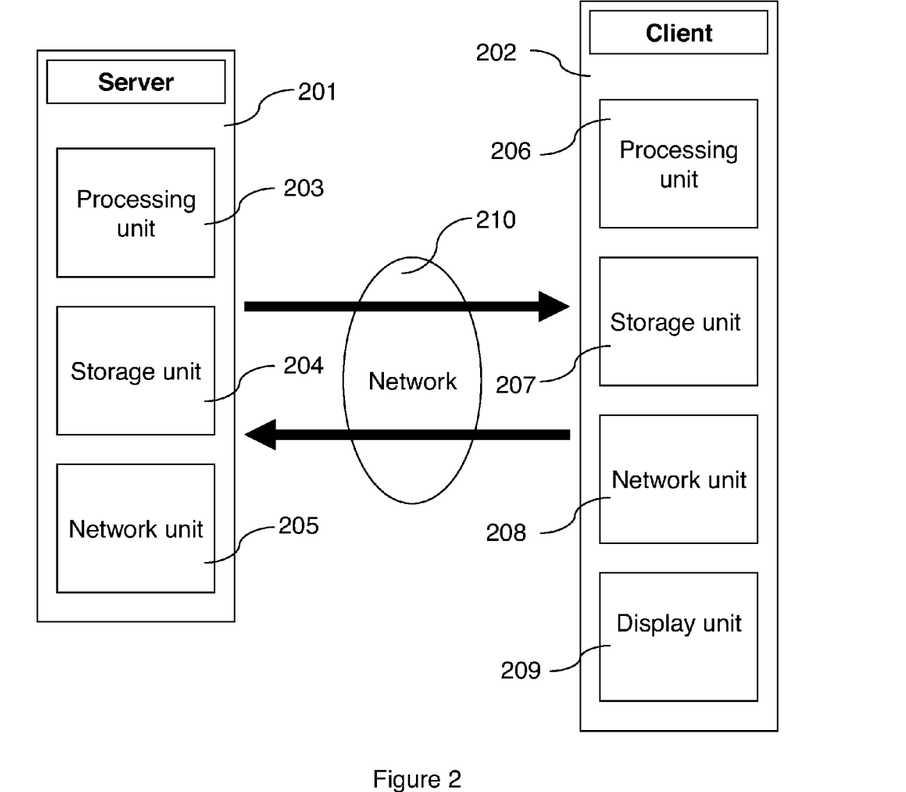
FIG. 2 is a representation of an embodiment of the device of the present invention in relation with a client and a network.

As represented in FIG. 2, the video transmission system is constituted of a server 201 and a client 202. The server 201 is constituted of a storage unit 204 storing encoded videos. In addition, the server is constituted of a processing unit 203 able to run programs, in particular programs implementing the transmission method of a scalable video according to the invention, and a network unit 205 able to transmit the video data over a network 210.

The client 202 is constituted of a storage unit 207, a processing unit 206 running the programs, a network unit 208 that receives of packets from the network 210 and a display unit 209. One of the tasks of the client 202 is to identify packet losses and to forward to the server 201 information representative of these losses.

Figure 3A:
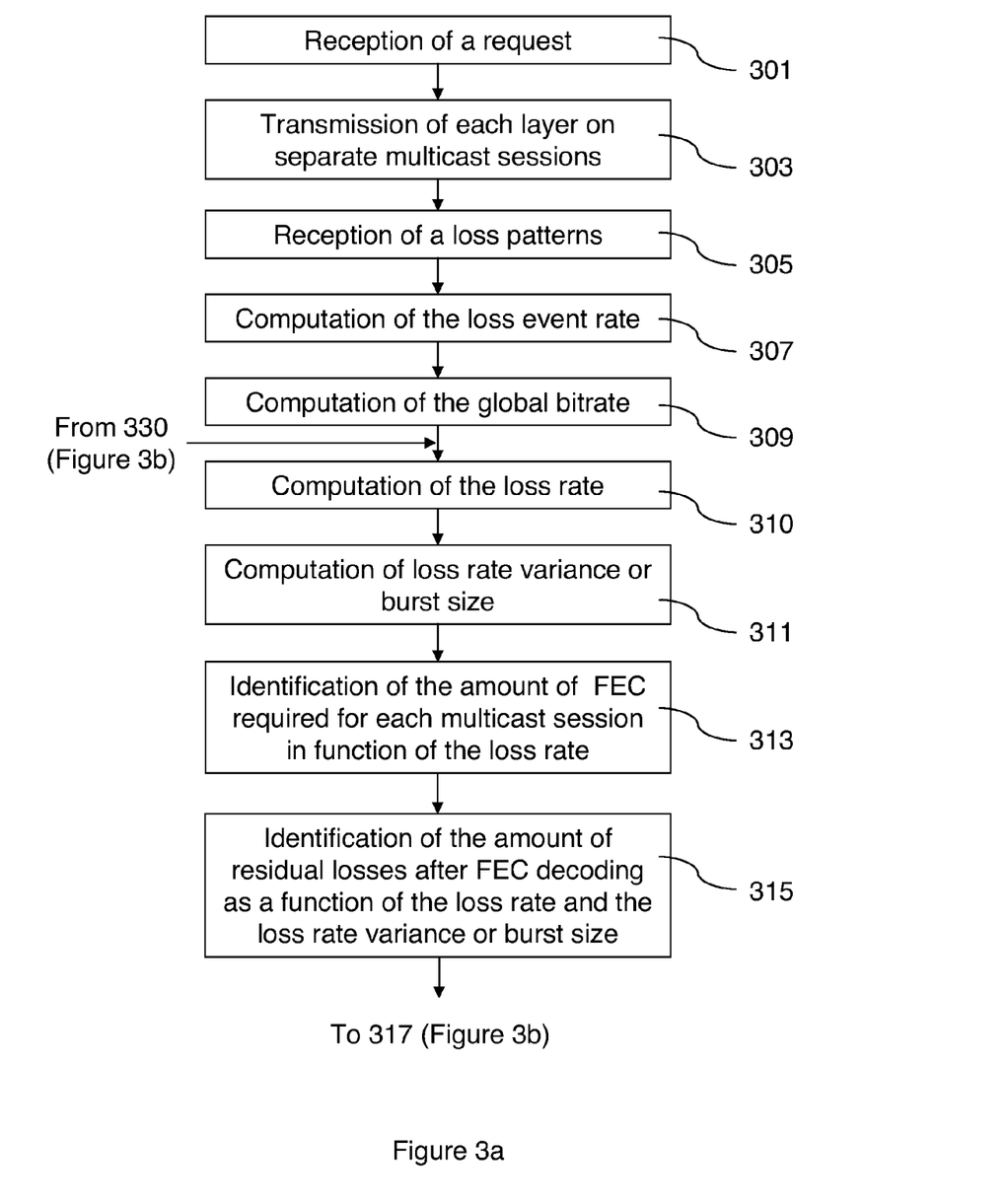
FIGS. 3a, 3b, 4, 5 and 6 are a representation, in the form of flowcharts, of steps of a particular embodiment of the method of the present invention
Figure 3B:
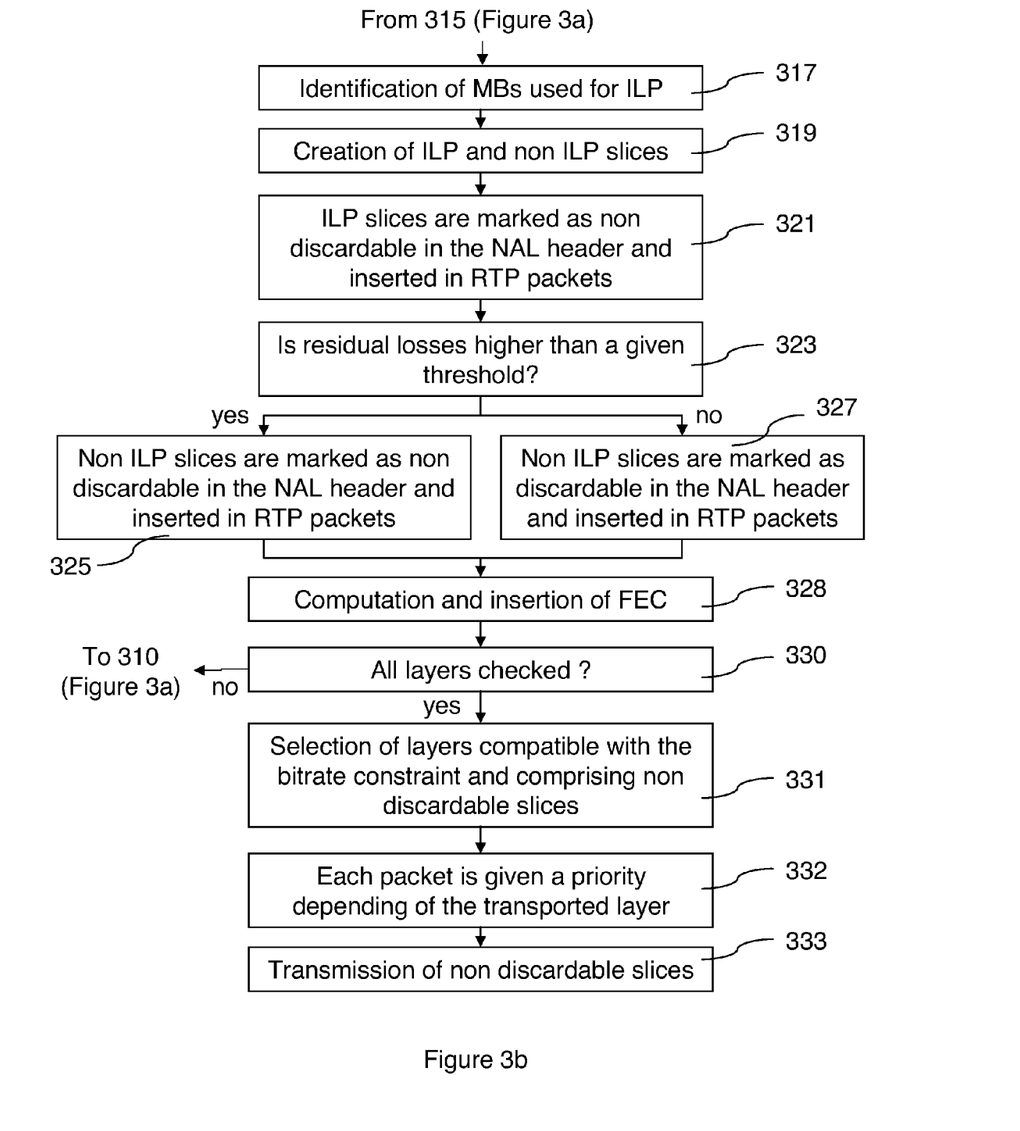
Figure 4:
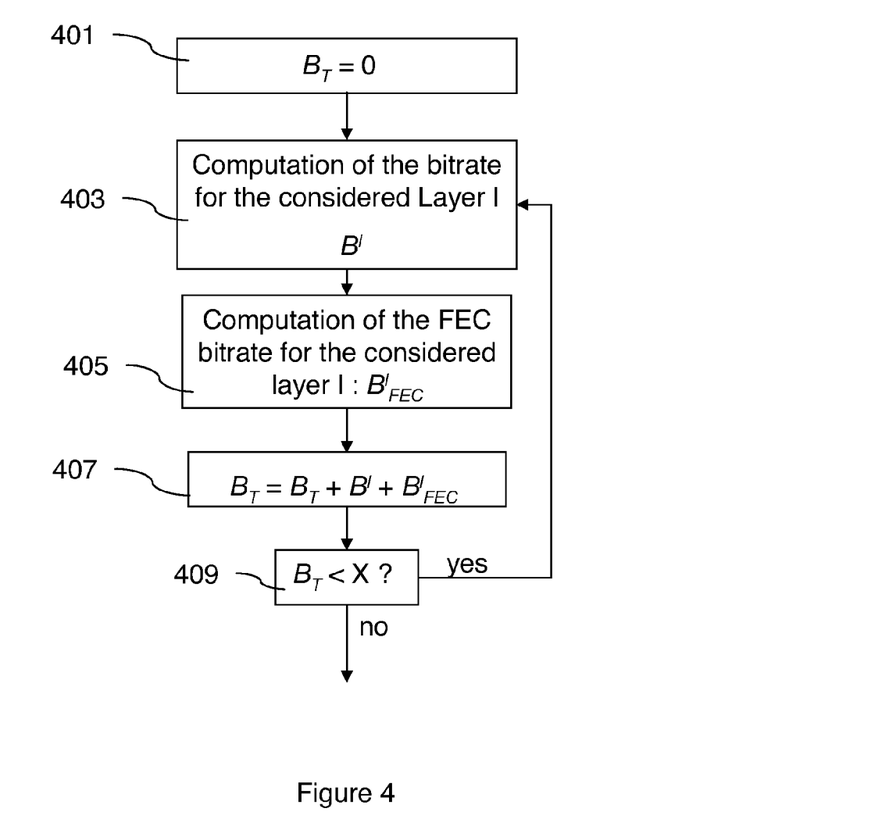

FIGS. 3 and 4 relate to steps performed on the server side.

During a step 301, a request from the client is received by the server. This request describes the video to be received by the client. It allows the server to retrieve this video in its storage unit and to start its transmission during a step 303. Note that during step 303, the server has no information on the network status. As a consequence, it cannot select efficiently the best set of layers to transmit. In order to solve this issue, it is supposed that the server has a pre-selection of layers to be transmitted at the beginning of a session, until information on the network status is received. Note also that, in a preferred embodiment, the server is supposed to transmit all data corresponding to a scalable spatial or quality layer on a dedicated multicast session. This feature induces that the server creates an RTP session for each layer. Theoretically, it allows de-correlation of the losses between the sessions. One consequence is that the server receives information representing the network status for each multicast session.

This information is received regularly thanks to RTCP packets transmitted by the client. In the present case, RTCP Receiver reports (or "RR") as described in section 6 of the document "RTC1889, RTP: A transport protocol for real-time applications" (H. Schulzrinne et al, 1996), is used. However, it is proposed to insert proprietary fields in these packets in order to allow a better evaluation of the network status on the server side. First, the following fields, which are useless for the application, may be avoided:

cumulative number of packets: encoded within 24 bits,
fraction lost: encoded within 8 bits and
inter-arrival jitter: encoded within 32 bits.

These fields are replaced by a 64-bit loss pattern. In this field filled up by the client, each bit represents a packet. The sequence number of the last packet of this set is provided by the field "extended highest sequence number received" existing in the usual RTCP syntax. The sequence numbers of all other packets are deduced from the position of their representing bit. It is supposed here that packets are transmitted in sequence number order. When a bit is set to "1", the packet is considered as received. Otherwise, the packet is considered as lost. The 64 bits therefore describe the loss behavior in a multicast session on a period corresponding to the transmission of 64 packets. Of course, the size of this "loss pattern" field can be extended or reduced based on the application needs.

There are alternatives to this embodiment, as, for example, using NACK instead of RR or differently modify the RR to carry the 'loss pattern' information.

During a step 305, the server receives RTCP packets containing the loss patterns for each multicast session. A set of information representative of the loss is then computed during steps 307 to 311, beginning by computation of values representative of the global transmission process. During step 307, the server computes the loss event rate which will be used for the computation of the available bitrate. In order to have a global value of the bitrate available on the network, the loss event rate is computed globally for all packets transmitted, independently of the multicast session. We consider therefore all loss patterns received for all sessions transmitted during the considered period as computed as the number of loss event divided by the total number of transmitted packets during the considered period.

A loss event represents a set of consecutive lost packets. When several packets are lost consecutively, they are considered as only one loss event.

The computation of the available global bitrate is performed during step 309 by using the TFRC formula:

$$X = \frac{S}{R \times \sqrt{2 \times b \times L_{er}/3} + \left(t_{RTO} \times 3 \times \sqrt{3 \times b \times L_{er}/8} \times L_{er} \times (1 + 32 \times L_{er}^2)\right)} \quad (1)$$

where X is the estimation of the available bitrate, R is the round trip time (or "RTT"), b is the number of packets acknowledged by a TCP acknowledgment, $L_{er}$ is the loss event rate and $t_{RTO}$ is the retransmission timeout. R is computed either on one session or as the average of the RTT on several multicast sessions.

Then, computing values characterizing the loss process of each multicast session beginning with the session transmitting the lowest scalable layer is started. The loss rate $L_r^1$ for layer 1 is computed, during step 310, as the number of lost packets divided by the number of transmitted packets during the considered period (here 64 packets are transmitted). During this step 310, optionally, the parameters of a model representative of the loss behavior can also be computed taking into account the fact that the losses follow a model with memory, i.e. losses are dependent events. The Elliot-Gilbert model proposes a good approximation of the losses over a network. This model is a two states Markov model with a received status and a lost status, and probabilities linking the two statuses:

p is the probability of falling in the lost status when being previously in the received status and
q is the probability of falling in the received status when being previously in the lost status.

Thus:
1-p is the probability of remaining in the received status and
1-q is the probability of remaining in the lost status.

p is computed as the number of transitions between the received status and the lost status divided by the number of packets transmitted during the observation period. q is computed as the number of transitions between the lost status and the received status divided by the number of packets transmitted during the observation period.

Next, a loss variability is estimated during step 311. In particular embodiments of the present invention, information representative of the loss variability is the loss rate variance or the size of burst of consecutive packet losses, which represents the average number of consecutive packet losses over a period of time. As a difference with the loss rate, the loss rate variance is computed on several periods. These periods can correspond to the set of 64 packets represented by the loss pattern, or correspond to sub-sets of these periods. A loss rate $L_r^t$ is computed for each period and an average of these loss rates $L_r^{A^t}$ is computed on a set constituted of the last n consecutive periods. Then the variance of the loss rate is computed with the following formula:

$$\sigma_l^2 = \frac{\sum_{t=1}^{n}\left(L_r^t - L_r^{A^t}\right)^2}{n}$$

The burst size $BS_l$ is a good representation of the variability of the loss rate. If the burst size is short, it means that the losses are equally spread during the analysis period and that the loss rate is representative of the loss behaviour. If the burst size is long, it means that losses are localized during the analysis period. As a consequence, an average value such as the loss rate does not provide a good representation of the loss behaviour during a short period. The burst size $BS_l$ could also be computed over a duration of one or several periods, but not as the average of burst sizes computed on each period because a burst may overlap on different periods.

The burst size $BS_l$ could also correspond to an average of several burst sizes observed during several periods, or to the maximum of the bursts sizes during these periods. In a preferred embodiment, the average of the burst sizes observed during n periods is used.

The computation of the information representative of the loss variability over the network is then followed by the estimation, during a step 313, of the amount of FEC ("forward error correction") data required for the considered scalable layer in its multicast session to be sure a reliable transmission occurs if the real loss rate observed during the transmission is equal to $L_r^l$. In a preferred embodiment, the FEC are generated by an error correcting code similar to a Reed-Solomon, for the macroblocks of the scalable layers to be transmitted in each multicast session. As mentioned above, the amount of FEC depends on the loss rate. Note that an amount of FEC is associated to each scalable layer constituting the video stream. However, only layers transmitted during the last estimation period are associated to information representing the network status. The server cannot obtain information for the layers that have not been transmitted. To deal with this issue, it is considered that these layers are transmitted on virtual multicast sessions on which the loss rate is at least equal to the maximum loss rate observed for the transmitted layers.

An amount of FEC is associated to the current GOP in the layer l. In a preferred embodiment, this amount of FEC is computed with the following formula:

$$B_{FEC}^l = B^l \times L_r^l$$

Where $L_r^l$ is the loss rate for the scalable layer l, $B^l$ is the bitrate of the current GOP in layer l, and $B_{FEC}^l$ is the bitrate of the FEC associated with the current GOP in layer l and required to protect this GOP. Other methods for computing the amount of FEC could be used. For instance, only a subset of the layers could be protected by the FEC, considering that other layers are less important.

A step 315 is performed to evaluate the amount of residual losses after the correction processing by the FEC data which are transmitted with each macroblock or group of macroblocks. This evaluation uses the loss variability (for example, the loss rate variance or the burst size) evaluated during step 311. When the loss rate variance is used, the residual losses are directly given by the following formula:

$$RL^l = \sigma_l$$

When the burst size is used, the estimation of the residual losses can use an evaluation of the joint probability of losing consecutive packets. In a preferred embodiment, the Elliot-Gilbert model is used to estimate the loss behavior over the network. The average probability of losing n consecutive packets is given by the following algorithm:

"Increment n by 1 until p(1−q)" is higher than a given threshold $T_{min}$".

where "n" represents the average burst size. n is increased while the joint probability of losing n consecutive packets is non negligible. Then the residual losses are given by the following formula:

$$RL^l = \max(BS_l) - n$$

where $\max(BS_l)$ is the maximum burst size encountered for a set of packets.

This step is followed by a step 317 during which pre-encoded macroblocks used for ILP in the current GOP in layer l are identified. This step 317, which requires an analysis of the SVC bitstream is performed on all spatial and CGS layers except the highest layer. This analysis, performed on each macroblock in layer l+1, consists in checking the values of base_mode_flag and motion_pred_flaglX[mbPartIdx] in the macroblock syntax. If set to "1", these flags indicate that the considered macroblock in layer l+1 is at least partially inferred from the co-located macroblock in layer l. The positions of macroblocks used for Inter Layer Prediction ("ILP") in layer l are stored in the server memory 204.

In a first embodiment, the step 317 is followed by a step 319 consisting in using Flexible Macroblock Ordering ("FMO") to create some slice groups to separate pre-encoded macroblocks used for ILP from pre-encoded macroblocks not used for ILP, so that the macroblocks used for ILP are grouped into first groups of macroblocks and the macroblocks not used for ILP are grouped into second groups of macroblocks. Two sets of slices are therefore created. Slices containing macroblocks used for ILP are named "ILP slices" (corresponding to the first groups of macroblocks) in the following description and other slices are named "non-ILP slices" (corresponding to the second groups of macroblocks). A transcoding is used to remove the dependencies between the different slices thus created. Indeed, Intra prediction and MV vector prediction have to be removed at the slices border. During step 319, ILP slices are inserted in a NAL. The flag "discardable_flag" in the NAL header is set to "1" during step 321 to indicate that the NAL cannot be discarded. The NAL is then inserted in an RTP packet.

This step is followed by a step 323, during which it is checked if there is a risk that residual losses remains after the correction by the FEC. If the amount of residual losses is higher than a predetermined threshold, then this step is followed by a step 325. Otherwise, it is followed by a step 327. In a preferred embodiment, the threshold is set to "0", considering that no residual losses are accepted. This threshold can be set to another positive value, if it is considered that less important packets could be lost. In such a case, the threshold can take a value representing the number of low priority packets in the considered GOP.

During step 325, non-ILP slices are inserted in NALs with a flag "discardable_flag" set to "1", indicating that the NAL cannot be discarded. To the contrary, during step 327, non-ILP slices are inserted in NALs with the flag "discardable_flag" set to "0", indicating that the NAL can be discarded.

These steps are followed by the actual computation of the FEC and their insertion in additional RTP packets during a step 328. FEC are computed on the data corresponding to the current GOP in layer l and according to the amount identified during the step 313.

During a step 330, it is determined if all scalable layers have been processed. If not, the process returns to step 310 with the next scalable layer transmitted on the next multicast session. If all scalable layers have been processed, during a step 331, the server performs the selection of the layers to be transmitted. This step 331 is described in more detail in FIG. 4.

During a step 401, the initialization of the cumulated bitrate $B_T$ is set to "0". Then, during a step 403, the server parses all the bitstreams corresponding to the considered GOP, layer by layer, starting with the lower layer. However, only NAL marked as non discardable are considered. During step 403, the bitrate $B^l$ corresponding to the considered layer l is computed. Then, during a step 405, the bitrate $B_{FEC}^l$ corresponding to the FEC associated with the current layer l is determined. These two bitrates $B^l$ and $B_{FEC}^l$ are then added to $B_T$ to obtain a new value of the cumulated bitrate $B_T$, during a step 407. The cumulated bitrate $B_T$ is then compared to the bitrate available on the network X, during a step 409. If $B_T$ is lower than X, the next scalable layer is checked during a new iteration of steps 403 to 409. Otherwise, the server transmits layers until the layer l−1 is transmitted.

The steps represented on FIG. 4 are followed by a step 332, during which each NAL is given a priority using the field "priority_id" in the NAL header depending on their spatial layer (dependency_id=Did), quality layer (quality₁₃ id=Qid) and temporal layer (temporal_id=Tid). These fields may be checked by routers when discarding some NAL in case of congestion.

Step 332 is followed by the transmission of packets transporting non discardable NAL selected during step 331, during a step 333. When all packets corresponding to the current GOP are transmitted, the server goes back to step 305, to handle the next GOP. During this step 305, the server uses the last received loss patterns to compute information representative of the current network status.

Figure 5:
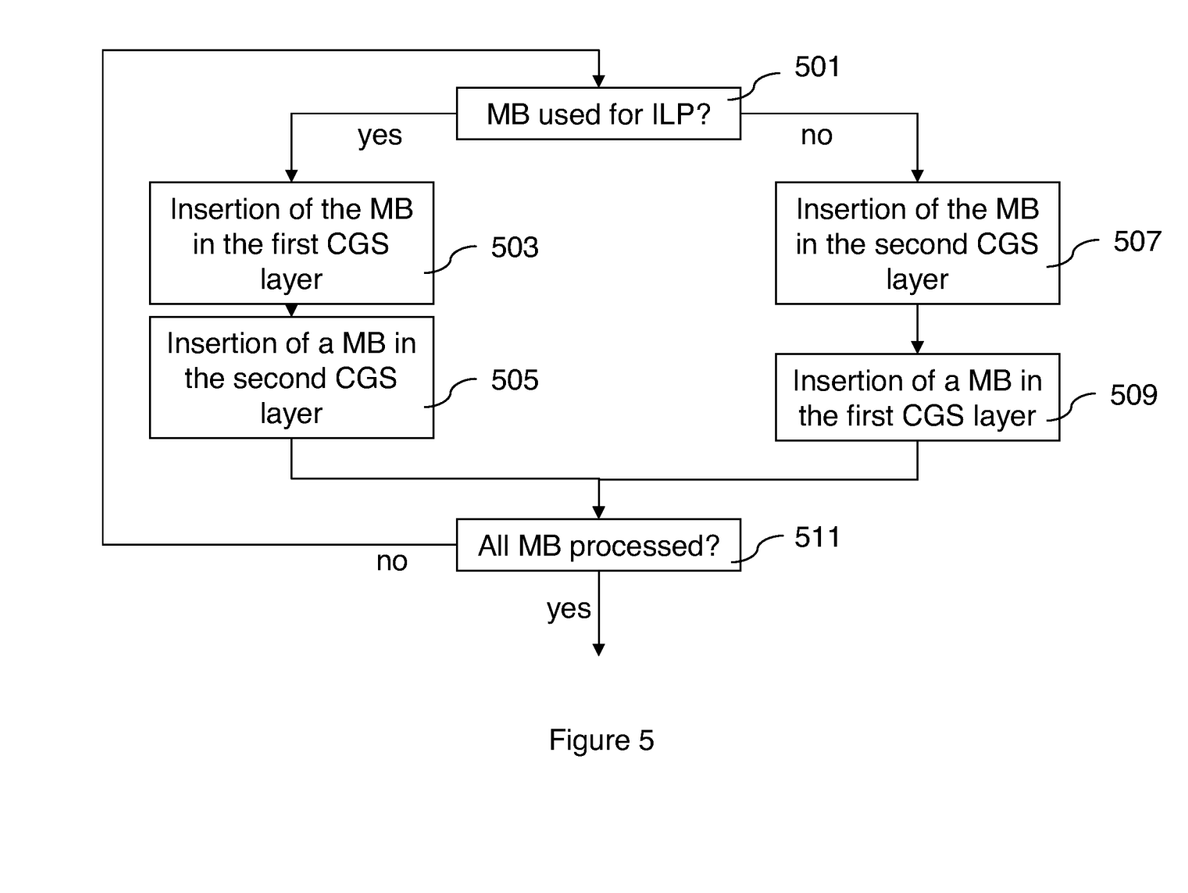

The FIG. 5 describes an alternative solution to the creation of ILP slices and non ILP slices consisting in creating two CGS layers in place of the current layer (see step 319). In that alternative embodiment, during a step 501, macroblocks identified as used for ILP are inserted in a first CGS layer, which groups first groups of macroblocks, while macroblocks not used for ILP are inserted in a second CGS layer grouping second groups of macroblocks.

If the macroblock is used for ILP, during a step 503, the bitstream corresponding to this macroblock is inserted in the first CGS layer bitstream. During a step 505, a macroblock corresponding to the same position is inserted in the second CGS layer. This macroblock is encoded with a "base_mode_flag" set to "1" and a "residual_prediction_flag" set to "1". The "coded_block_pattern" indicates that none of the six 8×8 blocks contains non zero coefficients. As a consequence, all information concerning this macroblock in the second CGS layer is inferred from the co-located macroblock in the first CGS layer.

If the macroblock is not used for ILP, during step 507, its bitstream is inserted in the second CGS layer. A macroblock corresponding to the same position is inserted in the first CGS layer to insure that this layer is conforming to the standard, and that the predictive coding of motion vectors is kept in this layer, during a step 509.

Figure 6:
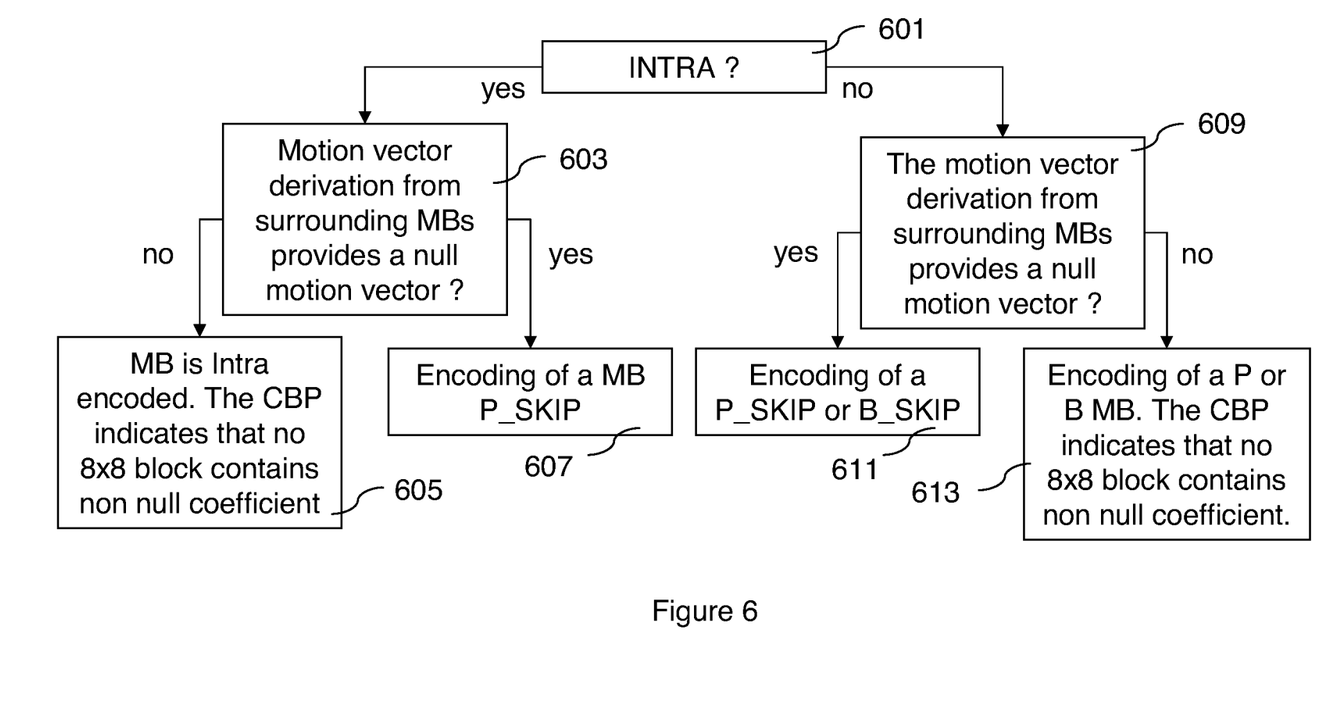

The encoding of the macroblock inserted in the first CGS layer depends on the original macroblock type and is represented in FIG. 6. This process starts by the identification of the original macroblock type. If, during a step 601, the macroblock is identified as an INTRA macroblock, the process continues by checking if the derivation of the MV of the current macroblock in the current layer from the surrounding encoded macroblocks leads to a null vector, during a step 603. Note that the derivation process allowing predicting the current motion vector from the motion vectors of the surrounding macroblocks is described in section 8.4.1.1 of the document "Join draft ITU-T Rec. H.264|ISO/IEC 14496-10/amd; 3 Scalable Video Coding", (T. Wiegand, G. Sullyvan, J. Reichel, H. Schwarz, M. Wien, 24th JVT meeting, Geneva, Switzerland, July 2007, JVT-X201.doc).

If the result of step 603 is yes, the macroblock is encoded as a P_SKIP macroblock and no further data are encoded for this macroblock, during a step 607. Otherwise, during a step 605, the macroblock is encoded as an INTRA macroblock with a "coded_block_pattern" indicating that none of the 6 8×8 blocks contain non zero coefficients.

If the macroblock is not an INTRA, step 601 is followed by a step 609. During step 609, it is checked if the derivation of the motion vector from the surrounding encoded macroblock provides a null motion vector difference, meaning that the current motion vector could be completely predicted from the surrounding macroblocks. If yes, during a step 611, a P_SKIP or a B_SKIP macroblock is encoded. Otherwise, during a step 613, the macroblock is encoded as a P or a B macroblock with a coded_block_pattern indicating that none of the 6 8×8 blocks contain non zero coefficients. The motion vector difference is encoded in order to retrieve the same motion vector as in the original macroblock. The choice of the macroblock type between B (respectively, B_SKIP) or P (respectively, P_SKIP) depends on the type of the original block.

Steps 505 and 509 are followed by the step 511 during which it is checked if all macroblocks have been processed. If no, step 501 is proceeded to. If yes, the process ends.

Returning to FIG. 3, during a step 321, NAL corresponding to the first CGS layer are marked as "non discardable" and inserted in RTP packets.

During step 325, NAL corresponding to the second CGS layer are marked as "non discardable", while, during a step 327, these NAL are marked as "discardable".

In the following, when the first and second CGS layers are non discardable, they are both transmitted on the same multicast session. In addition, they are protected by the same amount of FEC and have the same priority.

In the above description, were only described embodiments in which two sets of macroblocks are created and inserted either in slice groups or in scalable CGS layers. However, other embodiments of the present invention also provide for more than two sets.

In one of these embodiments, an additional set is created with macroblocks not used for ILP but providing a good quality if used for error concealment of the enhancement layer. This additional set could also be inserted in a dedicated slice group or CGS layer. The selection and transmission of the macroblocks of this additional set will depend on the same criteria based on the residual losses but with a threshold different than the one used in step 323. If the network available bitrate is sufficient, all macroblocks not used for ILP but which are efficient for the concealment of the enhancement layer can be transmitted.

Figure 7:
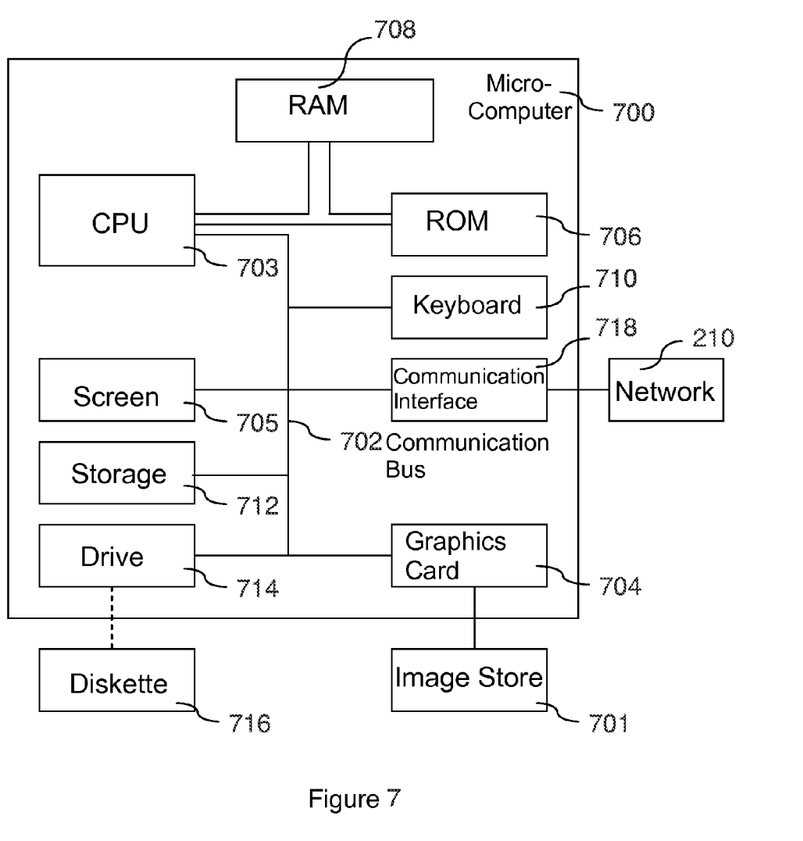
FIG. 7 is a schematic representation of a particular embodiment of the device of the present invention.

FIG. 7 shows a particular embodiment of the device of the present invention, server 201 or client 202, and different peripherals adapted to implement each aspect of the present invention. In the embodiment illustrated in FIG. 7, the device 700 is a micro-computer of known type connected, in the case of the server, via a graphics card 704, to a means for acquisition or storage of images 701, for example a digital camera or a scanner, adapted to provide image information to transmit.

The device 700 comprises a communication interface 718 connected to a network 210 able to transmit, as input, digital data to transmit and, as output, data transmitted over the network. The device 700 also comprises a storage means 712, for example a hard disk, and a drive 714 for a diskette 716. The diskette 716 and the storage means 712 may contain data to transmit, and a computer program adapted to implement the method of the present invention.

According to a variant, the program enabling the device to implement the present invention is stored in ROM (read only memory) 706. In another variant, the program is received via the communication network 210 before being stored.

The device 700 has a screen 705 for viewing the data to be transmitted or for serving as an interface with the user for parameterising certain operating modes of the device 700, using a keyboard 710 and/or a mouse for example.

A CPU (central processing unit) 703 executes the instructions of the computer program and of programs necessary for its operation, for example an operating system. On powering up of the device 700, the programs stored in a non-volatile memory, for example the read only memory 706, the hard disk 712 or the diskette 716, are transferred into a random access memory RAM 708, which will then contain the executable code of the embodiment of the program of the present invention as well as registers for storing the variables necessary for its implementation.

Naturally, the diskette 716 may be replaced by any type of removable information carrier, such as a compact disc, memory card or key. In more general terms, an information storage means, which can be read by a computer or microprocessor, integrated or not into the device, and which may possibly be removable, stores a program of the present invention. A communication bus 702 affords communication between the different elements included in the device 700 or connected to it. The representation, in FIG. 7, of the bus 702 is non-limiting and, in particular, the central processing unit 703 unit may communicate instructions to any element of the device 700 directly or by means of another element of the device 700.

The device described here and, particularly, the central processing unit 703, may implement all or part of the processing operations described with reference to FIGS. 3a to 6, to implement each embodiment of the method of the present invention and constitute each device of the present invention.

The invention claimed is:

1. A method for transmitting video data encoded in a scalable video stream representing said video data in a plurality of layers, comprising, for at least one layer:
    a step of obtaining pre-encoded macroblocks of said scalable video stream representing said video data in a plurality of layers,
    a step of grouping macroblocks, used for inter layer prediction, of the pre-encoded macroblocks obtained by the obtaining step, into first groups of macroblocks,
    a step of grouping macroblocks, not used for inter layer prediction, of the pre-encoded macroblocks obtained by the obtaining step, into second groups of macroblocks,
    a step of estimating on a plurality of periods of time, a metric of loss rate variance over a network, said loss rate variance being based on deviation of a loss rate computed for each period from an average of loss rates computed on a set comprising a plurality of consecutive periods,
    a step of selecting groups of macroblocks from the first and second groups of macroblocks based on the metric of loss rate variance estimated by the estimating step, and
    a step of transmitting the groups of macroblocks selected by the selecting step over the network.

2. The method according to claim 1, wherein pre-encoded macroblocks are encoded using a video coding standard and in the steps of grouping macroblocks, groups of macroblocks correspond to a syntaxical entity of said video coding standard.

3. The method according to claim 2, wherein said video coding standard uses slices for encoding groups of macroblocks, and wherein in the steps of grouping macroblocks, macroblocks are gathered into groups corresponding to slices.

4. The method according to claim 2, wherein said video coding standard comprises scalable quality layers and wherein in the steps of grouping macroblocks, macroblocks are gathered into groups corresponding to scalable quality layers.

5. The method according to claim 1 wherein, in the step of estimating the metric of loss rate variance, the estimated metric of loss rate variance is based on the equation:

$$\sigma_l^2 = \frac{\sum_{t=1}^{m}(L_r^t - L_r^{A^l})^2}{n}$$

wherein $L_r^t$ is a loss rate computed for each period and $L_r^{A^l}$ is an average of loss rates computed on a set constituted of the last n consecutive periods.

6. The method according to claim 1 wherein, in the step of estimating the metric of loss rate variance, the estimated metric of loss rate variance is based on a size of a burst of consecutive packet losses.

7. The method according to any one of claim 5 or 6, wherein, in the step of estimating the metric of loss rate variance, a loss pattern received from a receiver of the transmitted macroblocks is processed.

8. The method according to claim 1, wherein the groups of macroblocks selected by the selecting step are included in layers of the said plurality of layers representing said video data, and, in the transmitting step, a subset of layers representing said video data is transmitted, said subset being selected based on a computed network available bitrate.

9. The method according to claim 8, wherein the computation of the network available bitrate comprises the computing of a loss event rate providing a representation of the packet loss process over the network.

10. The method according to claim 1, wherein said video data is represented in a plurality of scalable layers comprising scalable spatial layers and/or scalable quality layers, and wherein, in the step of transmitting selected macroblocks, all data corresponding to a scalable spatial or quality layer are transmitted on a dedicated multicast session of said transmitting step.

11. The method according to claim 1, wherein, in the step of selecting groups of macroblocks based on the estimated loss variability, the selection of macroblocks from the first and second groups of macroblocks is done based on an estimation of errors remaining after a correction by an error correction process based on forward error correction data transmitted for said macroblocks.

12. The method according to claim 1, wherein, in the step of grouping macroblocks not used for inter layer prediction, macroblocks not used for inter layer prediction are separated into a plurality of second groups of macroblocks based on their efficiency for error concealment of an enhancement layer and, in the step of selecting macroblocks from said plurality of second groups of macroblocks, the selection is based on said efficiency for error concealment of an enhancement layer.

13. A device for transmitting video data encoded in a scalable video stream representing said video data in a plurality of layers, comprising:
    means for obtaining pre-encoded macroblocks of said scalable video stream representing said video data in a plurality of layers,
    means for grouping macroblocks, used for inter layer prediction, of the pre-encoded macroblocks obtained by the obtaining means, into first groups of macroblocks,
    means for grouping macroblocks, not used for inter layer prediction, of the pre-encoded macroblocks obtained by the obtaining means, into second groups of macroblocks,
    means for estimating on a plurality of periods of time, a metric of loss rate variance over a network, said loss rate variance being based on deviation of a loss rate computed for each period from an average of loss rates computed on a set comprising a plurality of consecutive periods, means for selecting groups of macroblocks from the first and second groups of macroblocks based on the metric of loss rate variance estimated by the estimating means, and means for transmitting the groups of macroblocks selected by the selecting means over the network.

14. A computer program stored on a non-transitory computer-readable medium and loadable into a computer system for being read by the computer system, said program containing instructions which, when executed by the computer system, cause the computer system to implement the method according to claim 1.

15. A non-transitory information carrier readable by a computer or a microprocessor, storing instructions of a computer program, that enables implementation of the method according to claim 1.

* * * * *